(12) United States Patent  (10) Patent No.: US 8,650,997 B1
Simon  (45) Date of Patent: Feb. 18, 2014

(54) MACHINE FOR CUTTING OF MASONRY, WOOD AND OTHER MATERIALS

(71) Applicant: John Simon, Penal (TT)

(72) Inventor: John Simon, Penal (TT)

(*) Notice: Subject to any disclaimer, the term of this patent is extended or adjusted under 35 U.S.C. 154(b) by 0 days.

(21) Appl. No.: 13/730,821

(22) Filed: Dec. 28, 2012

Related U.S. Application Data

(60) Provisional application No. 61/582,072, filed on Dec. 30, 2011.

(51) Int. Cl.
*B26D 5/08* (2006.01)
*B26D 7/06* (2006.01)
*B26D 7/22* (2006.01)

(52) U.S. Cl.
USPC .................. 83/98; 83/100; 83/167; 83/477.2

(58) Field of Classification Search
USPC .......... 83/98, 100, 167, 477.2, 165, 104, 105, 83/162, 438, 440, 446, 467.1, 468, 468.7, 83/522.17, 522.18, 19; 144/252.1, 252.2, 144/286.1, 286.5, 287, 253.1, 253.5; 29/102, DIG. 79, DIG. 102
See application file for complete search history.

(56) References Cited

U.S. PATENT DOCUMENTS

| | | | |
|---|---|---|---|
| 2,444,598 A | | 7/1948 | Eyles |
| 2,499,582 A | | 3/1950 | Harrison |
| 2,696,854 A | * | 12/1954 | Woodruff .................. 83/435.14 |
| 3,170,454 A | | 2/1965 | Mangis |
| 4,326,864 A | * | 4/1982 | Sittler ............................. 55/364 |
| 4,483,573 A | * | 11/1984 | Keller ........................... 312/281 |
| 5,020,578 A | | 6/1991 | Jennings |
| 6,253,757 B1 | | 7/2001 | Benson |
| 6,273,081 B1 | | 8/2001 | Gorgol |
| 6,817,275 B1 | | 11/2004 | Chin-Chin |
| 7,287,453 B2 | * | 10/2007 | Kuo ........................... 83/435.15 |
| 2003/0213349 A1 | | 11/2003 | Chang |
| 2005/0205075 A1 | | 9/2005 | Guth |
| 2007/0034292 A1 | | 2/2007 | Smith |
| 2008/0087153 A1 | | 4/2008 | Lee |

OTHER PUBLICATIONS

Building a Sliding Table for Your Tablesaw, retrieved from http://www.highlandwoodworking.com/aslidingtableforyourtablesaw.aspx Mar. 1, 2013, published by Highland Hardware, Inc., publication date and author unknown.

SwapTop™ Table Saws Users Guide, retrieved from http://www.inlandcraft.com/Uguides/UGarchive/UGswaptopsaw.htm Mar. 1, 2013, published by Inland Craft Products, Co., publication date and author unknown.

* cited by examiner

*Primary Examiner* — Ghassem Alie
(74) *Attorney, Agent, or Firm* — Law Office of Oliver Edwards LLC; Oliver Edwards; Oscar Llorin

(57) ABSTRACT

A machine for accurately cutting tiles, blocks of concrete, clay, blocks of stone and stone materials, wood and wooden materials is described. It may include a support stand which at its top supports a removable bed structure. The bed includes a motor-driven cutting disc recessed-mounted axially along pillow blocks such that a substantial portion of the cutting disc is projected above the bed surface and its mode of rotation is about a fixed centralized axis. Trolley track rails situated on distal ends of both long sides of the bed allow for lateral movement of the trolley above the bed surface to facilitate the cutting operation. During operation the object secured safely on the trolley which is manually moved towards the cutting disc while a perforated shower head sprays water onto the work piece. Water is filtered and recycled back to the shower via the bin situated below the cutting disc and then to the recycle and filter unit.

11 Claims, 10 Drawing Sheets

MACHINE FOR CUTTING OF MASONRY, WOOD AND OTHER MATERIALS

This application claims priority to provisional patent application No. 61/582,072 filed Dec. 30, 2011, which is hereby incorporated herein by reference in its entirety.

BACKGROUND OF THE INVENTION

1. Field of the Invention

The present invention relates in general to machines used in the accurate cutting of tiles of ceramic, porcelain, clay, marble, granite and composites and similar, blocks of wood, quarry tiles, blocks of concrete or clay, blocks of stone, stone materials, slates, conglomerates and similar by the effective use of a sliding trolley on a track or rails above a working table or bed secured upon a support structure. The movement of the trolley is to allow the work piece to engage the cutting tool or blade or disc where in this invention is fixed within the bed structure. It also relates to machines that can be easily transported or moved given their compact and modular construction.

2. Related Art

Conventionally, methods used for the accurate cutting of tiles, concrete blocks, clay bricks, blocks of wood and blocks of stone have never been consolidated into a singular machine, but rather, each machine with a unique object of processing. The cutting of these objects is ordinary within the construction industry where it can be found the intricate use of tiles of porcelain, clay, ceramic, marble, slate and granite each sometimes require unique and diverse cuts for specific sizing. These tiles are both functional and decorative in purpose where their application can be found in interior and exterior floors, walls, columns, counters tops, showers and baths of domestic and commercial buildings, roadways and walkways. Also, blocks of stone, concrete blocks and clay bricks are not all left without alteration requirements since proper building construction necessitates that these alterations be done since they are the principal materials in use.

In many conventional designs there exists in general two methods of engagement. First, a work piece is held fixed or fastened onto a bed surface while a cutting tool attached to a moving arm (pivoted at one end of the bed) is allowed to manually engage the work piece where all measures of control are exercised on the cutting tool. Or, second, a cutting tool is held fixed either above in suspension to the bed surface or partially recessed in the bed surface and the work-piece is made to manually engage the cutting tool either on a supported sliding table or unsupported, which by extension is of least accuracy.

BRIEF SUMMARY OF INVENTION

Accordingly, the limitations and problems as just described in the prior art are obviated according to the present invention as it relates in particular to a machine so designed that a working platform or bed is removably mounted onto a support stand or base with all degree of mobility on natural and man-made surfaces. The bed is disposed over a semi-projected motor driven cutting disc such that an appropriate portion of the disc is available above the bed surface for the cutting process. A trolley track allows manual movement of a trolley mounted on the track to achieve a successful cut. The trolley through its design facilitates the cutting process by securing the work piece using a block guide and providing a through-pass for the cutting disc to engage the work piece on the trolley along the inscribed cut line while the trolley is being moved in the direction of the cutting disc by means of a suitable handle. The rotation of the disc is typically in a direction towards the bed center at the end where the object advances to the cutting disc so as to prevent ground particulates dispersion to the air from the cutting process.

In the non-wood cutting process, a shower sprays water onto the work piece as a cutting aid and dust smother. Effluent water expended during cutting is channelled through a bin and collected in a recycle and filter unit where the water is filtered of entrained particulates by means of a series of filters and baffles and pumped back through the shower by means of a submersible pump, forming a closed-looped water circuit. This system is meritorious, novel and eliminates dust and water pollution associated with these processes since all is collected in the recycle and filter unit and the effluent water is not discharged into the work environment.

The modular design of the recycle and filter unit is a practical feature of embodiments of the present invention, incorporating a shower, water hoses and submersible water pump that collectively, can be utilized in conjunction with systems or machines requiring similar facilities during material cutting of similar type. A drain plug on one end of the unit can be removed to drain the unit through an outlet port; this, together with addition of fresh water, may keep the water turbidity within acceptable measure. A means is available to admit water directly to the shower via a connected water valve without use of the recycle and filter unit as in situations where the submersible water pump were to fail in operation due to electrical power failure or otherwise.

A bin positioned underside the bed serves as an intermediate accumulator and channel for the guided passage of effluent water from the bed surface and thence to the recycle and filter unit via a waste water hose.

The bin as just mentioned is quite unique both in function and design and presents an advantageous effect in the operational features of this machine. By virtue of its existence, there is no concern of water flooding onto or around work areas, neither uncontrolled wood cuttings nor sawdust left to the discretion of the wind, as the bin through its plural functions eliminates these common problems. It must be emphasized that such features are incorporated with the consideration of environmental preservation and cleanliness, which by extension makes for a comfortable work environment and increased worker safety. Such features are not likely seen in conventional machines.

The cutting of wood may be done in collaboration with a wood cutting table top locked onto the machine bed, where a blade slot ensures the cutting blade to be projected sufficiently above the wood cutting table top. A choice of wood cutting blade is discretionary owing to the inherent flexibility of operating modes. In such operation the wood is placed onto the wood cutting table top, a transparent wood cutting shield may be secured to the side of the machine bed and can be aligned and adjusted to provide suitable eye and operator protection. While the blade is in rotation, the wood piece is directed to the cutting blade in a manual fashion so as to cut the wood along inscribed cut lines in an effective and safe manner. The pieces are removed and the process may be repeated. Wood shavings produced during wood cutting operation are contained and directed where they can be easily disposed by disjoining a lower section of the bin to efficiently remove the wood cuttings to an appropriate containment for disposal.

Various means is provided to dismount the machine into several modular units comprising the wood cutting table top, trolley, wood cutting shield, bed with motor and blade arrangement, recycle and filter unit and the bin, where each modular unit may be fitted with handles for easy removal and mounting. The support stand may include both caster wheels for easy mobility and adjustable legs for stationary support.

BRIEF DESCRIPTION OF DRAWINGS

For a comprehensive exposure of the features, nature and advantageous effects of the present invention, reference is now made to the detailed description in conjunction with the associated drawings, in which.

DETAILED DESCRIPTION OF THE INVENTION

Figure 1:
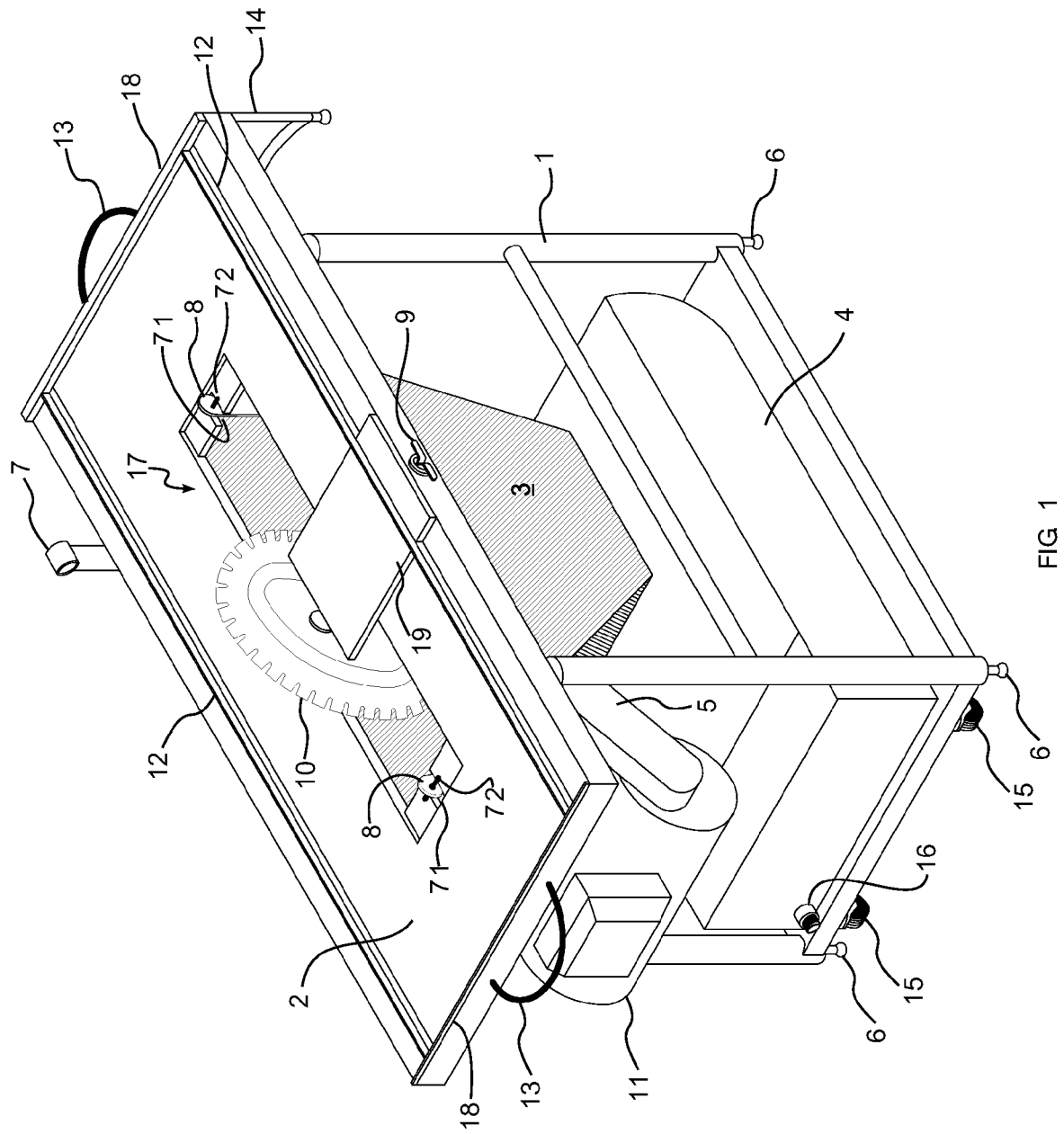
FIG. 1 is an isometric view of an exemplary apparatus in accordance with an embodiment of the present invention.

FIG. 1 illustrates a block, stone, tile and wood cutting apparatus in accordance with an exemplary embodiment of the present invention. The apparatus comprises main support stand 1 which comprises adjustable legs 6 appended at the base that provide stability and lockable wheels 15 that provide means of mobility. Mountable upon support stand 1 is removable bed 2 upon which certain modes of operation are carried out. Handles 13 may be fitted, preferably each short side, to facilitate easy lifting and removing or mounting of bed 2 from or onto support stand 1.

Figure 4:
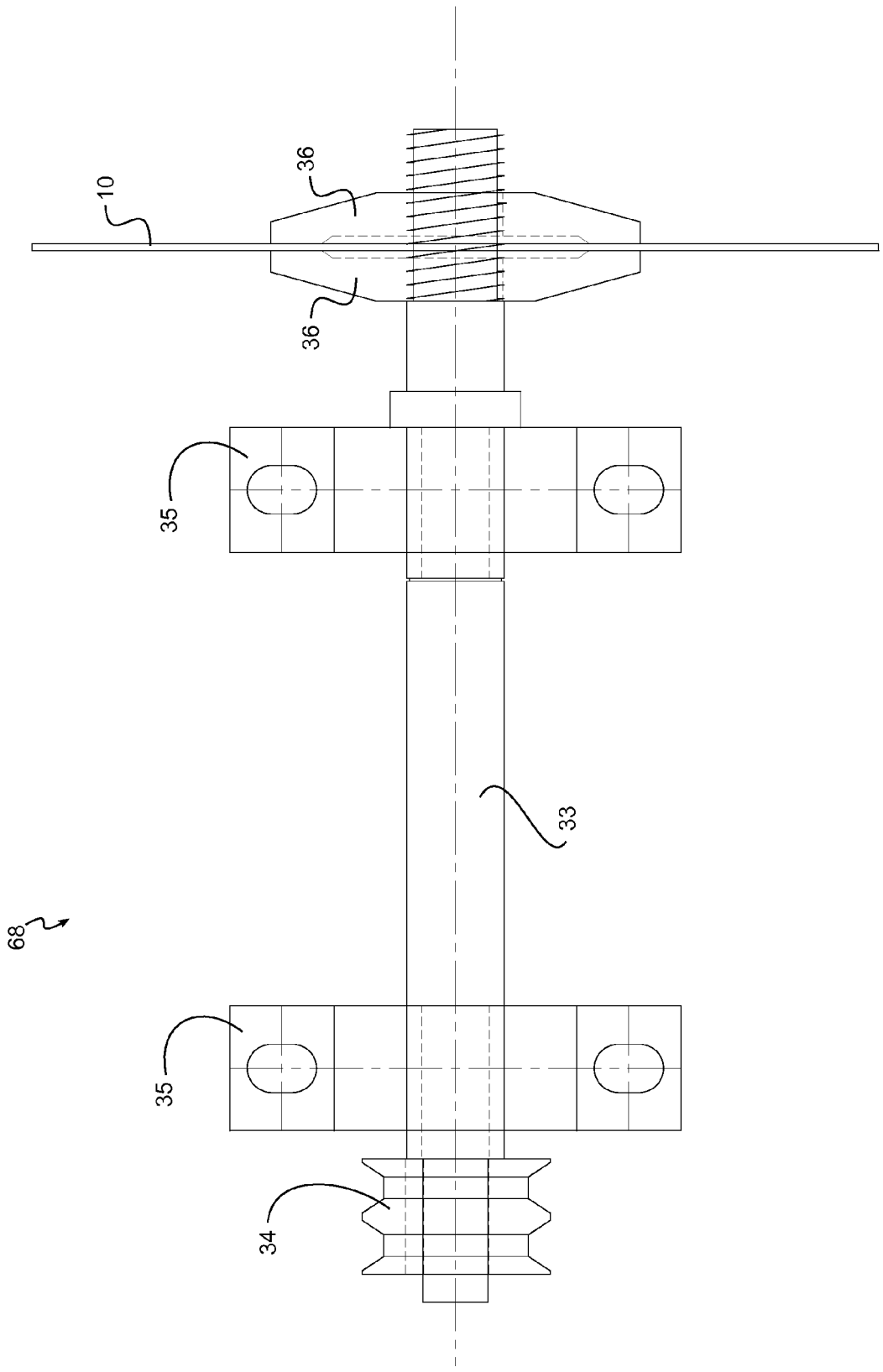
FIG. 4 an assembly drawing of an exemplary shaft apparatus including pillow block bearings, saucers, cutting disc and double pulley arrangement in accordance with an embodiment of the present invention.

Bed 2, much articulated by design, incorporates various features that allow for attachment to other elements of the machine. In accordance with a preferred embodiment and with reference to FIGS. 2A, 2B and 2C, frame motor support stand 21 is the attachment support for electrical motor 11 that drives cutting disc 10 via a belt-pulley arrangement. This configuration can provide safety by virtue of its location under bed 2 yet with an acceptable degree of accessibility to facilitate removal or service. Bed support stand 14 may be provided to ensure the independence of bed 2 when disjoined from the main support stand 1; as such, bed 2 can remain unaided without care of obliqueness when placed on a natural surface. Frame motor stand support 21 may include belt guard support bracket 20 that connects the belt guard 5 (see FIG. 1) in place so as to provide a secure channel for belt movement throughout a straight path where the belt (not shown) engages a double pulley 34 of cutting disc assembly 68 (see FIG. 4). With reference to FIG. 4, cutting disc shaft assembly 68 may include double pulley 34 fixed onto a shaft 33 which may be held in position by, e.g., pillow block bearings 35. Pillow block bearings 35 may be supported by shaft support plate 19 (see FIG. 1) to which the two pillow block bearings 35 are fastened. On an end of shaft 33 distal to bed's 2 interior may be a terminal point of double pulley 34 which is encompassed with the motor shaft (not shown) at the driver end via a drive belt (not shown). This configuration secures the passage and particularly isolates the belt from interference even by merit of its short loop distance. On an end of shaft 33 proximal to bed 2 interior is an access point where cutting disc 10 may be mounted onto shaft 33; disc 10 may be held fast into position on the shaft between two saucers 36. Returning to FIGS. 1 and 2A-C, access of cutting disc 10 is provided above the surface of bed 2 by means of an adequately sized opening 17 at an interior location of bed 2 thereby allowing the blade 10 to be sufficiently projected above the surface of bed 2; this provides an adequate means for engagement of a work piece with blade 10 during operation.

Bed 2 top surface may include a trolley track comprised of one or more rails 12; in a preferred embodiment, bed 2 includes two trolley track rails 12 in close proximity to either long outer edge that traverses linearly along the entire bed top surface. Trolley track rails 12 act as a conveyor for trolley 24 and a containment for water expended in the cutting process. Water expended during the cutting process may be contained by a circumscription formed by trolley track rails 12 on both ends and end stops 18 on the other two adjacent sides. The water contained is not confined indefinitely, but may be discharged through opening 17 into bin 3 of bin assembly 67 mounted at the underside. In one embodiment, bin 3 may be supported beneath bed 2 by means of wing flanges 8 inserted through bed slots 71 and secured with pins 72.

Figure 2A:
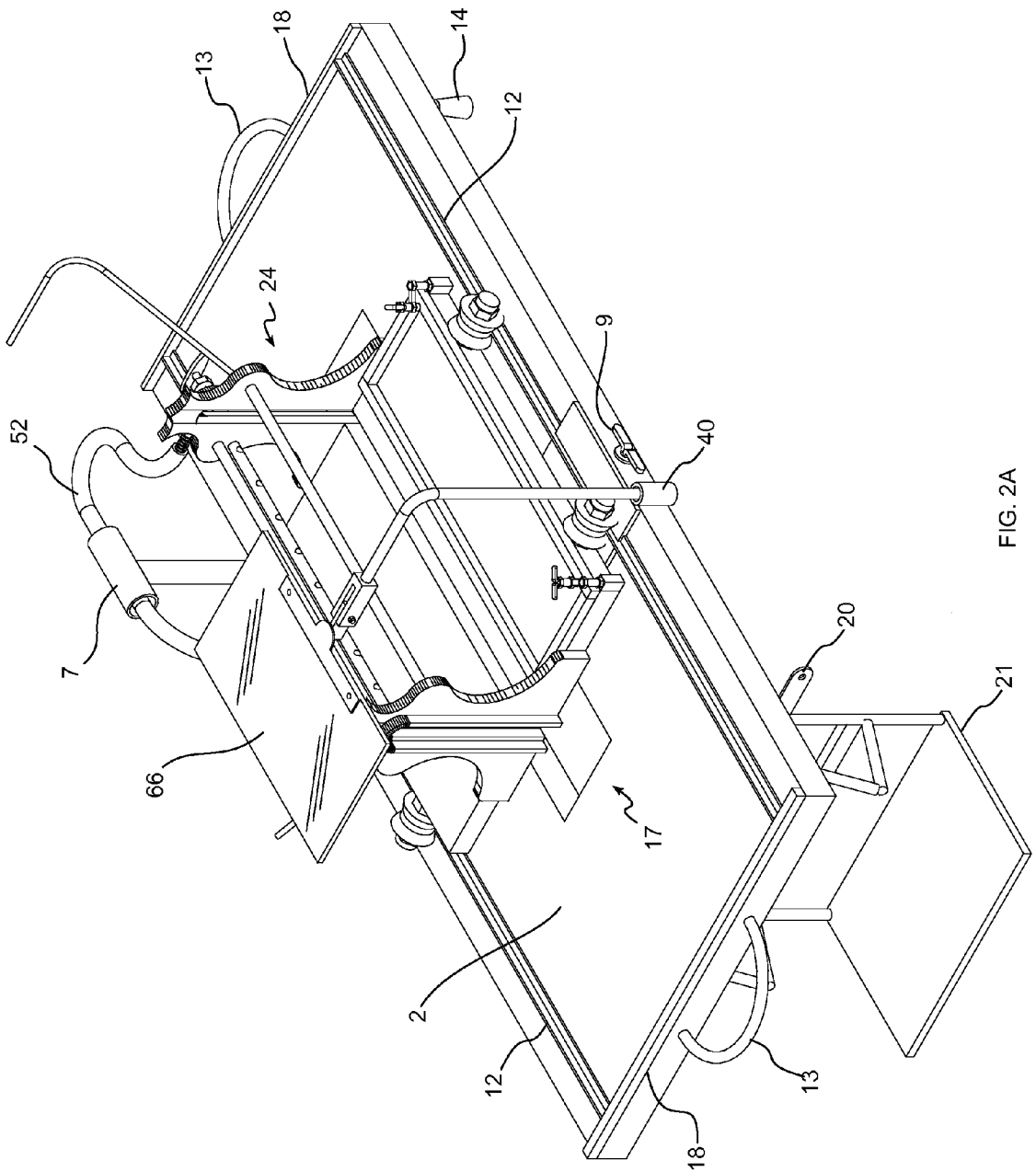
FIG. 2A is an isometric view of an exemplary apparatus including a mounted trolley in accordance with an embodiment of the present invention.
Figure 2B:
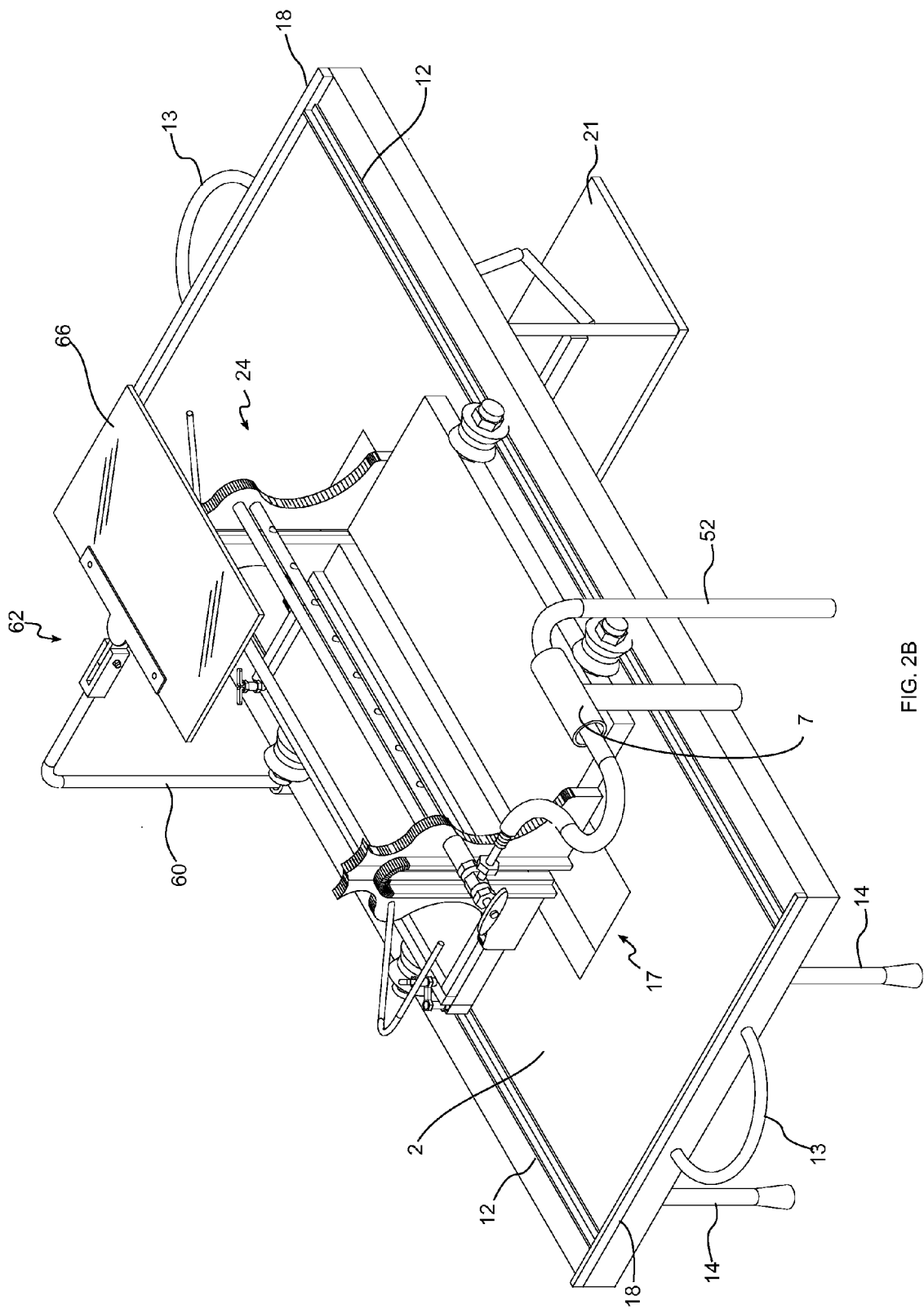
FIG. 2B is another isometric view of an exemplary apparatus including a mounted trolley in accordance with an embodiment of the present invention.
Figure 3:
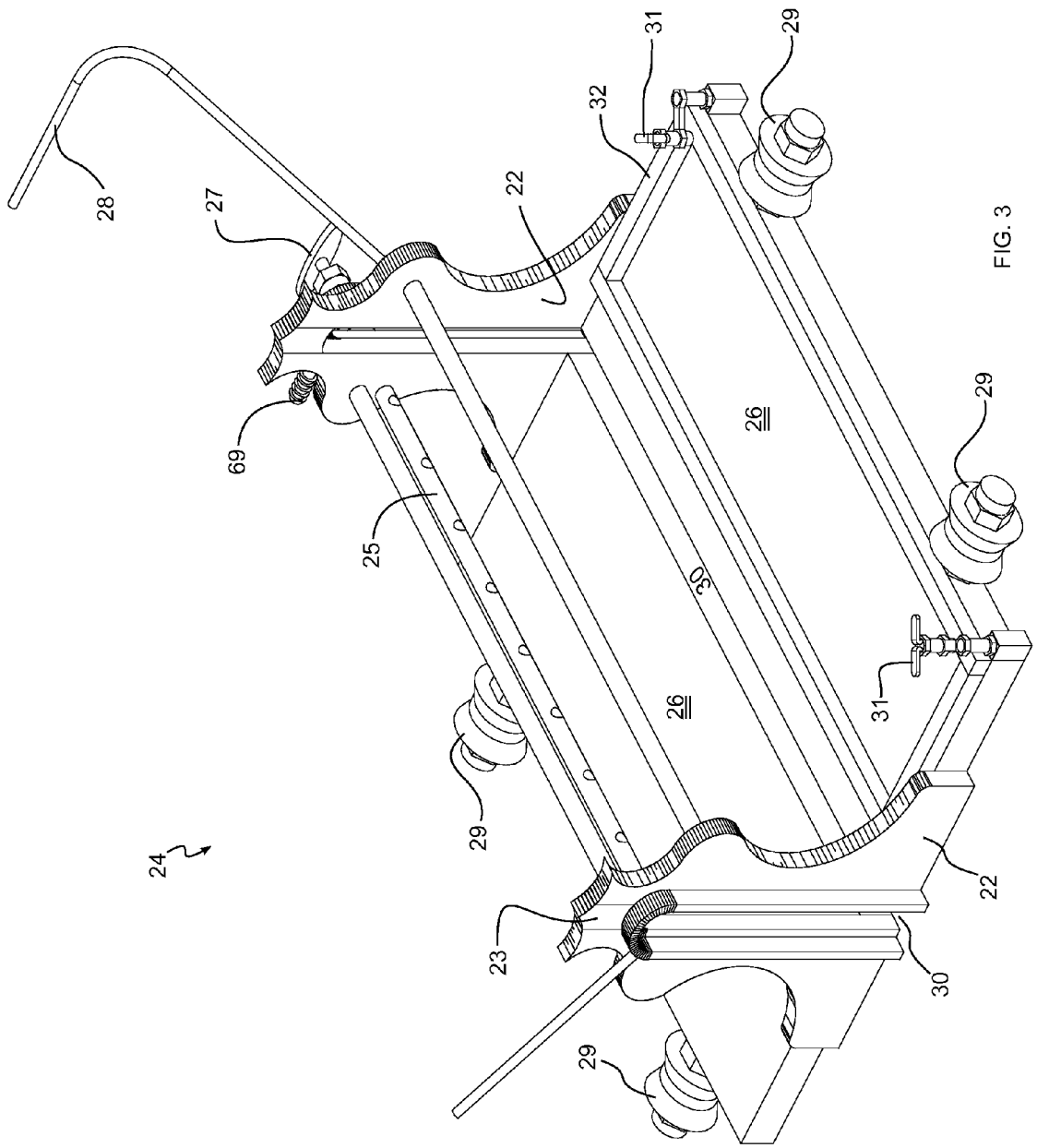
FIG. 3 is an isometric view of an exemplary trolley apparatus in accordance with an embodiment of the present invention.

With reference to FIGS. 2A, 2B and 3, in one exemplary mode of operation, trolley 24 is provided as a carriage operable to traverse bed 2. End stops 18 may be provided on either or both extremes of bed 2. Trolley 24 is configured to support a work piece to safely engage the cutting tool or disc 10 and provides a means to achieve a most accurate cut once set. The movement of trolley 24 may be facilitated by wheels 29, for example, four small sheaves or grooved-edged metal wheels fitted onto sides of trolley 24 and adequately spaced apart that trolley 24 may roll on trolley tracks 12 on bed 2 unrestricted or without cause of derailment. To promote this movement, handle 28 may be outfitted at an end of trolley 24 as a means of moving and controlling the trolley 24 between both extremes of bed 2 in a very safe manner requiring no worker contact with the work piece.

In order for trolley 24 to slide over the projected cutting disc 10, access-way 30 is provided throughout the flat horizontal surface 26 of trolley 24, essentially dividing the flat horizontal surface into two sections which are kept apart and fixed by two supporting end-faces 22. As such the access-way 30 is continued throughout these end faces 22 just short of its length providing sufficient clearance for the cutting disc to pass uninhibited. The two end-faces 22 are held fast and supported by means of a connecting arm 23 to the top of trolley 24. A concrete block guide 32 may be placed on one side of the trolley's flat surface 26 and be used to keep the line of cut of the work-piece aligned to the cutting disc 10; this is accomplished by the concrete block guide 32 acting as a backing edge that prevents lateral movement of the work-piece on trolley work surface 26. Easy adjusting and securing of the concrete block guide 32 may be provided by a fastening assembly. In one embodiment, the fastening assembly may comprise two adjustment-nuts 31 disposed to engage corner areas of concrete block guide 32. With adjustment nuts 31 untightened, the concrete block guide 32 is free to move laterally across the trolley work surface 26 to the point of support to the work-piece. Concrete block guide 32 may then be secured in position by tightening both adjustment nuts 31. The means provided within trolley 24 to accommodate movement over the blade 10 is effectuated during operation, as such; the operator may place the work-piece onto trolley work surface 26, fixed and aligned using the concrete block guide 32. In operation trolley 24 is manually moved on rails 12 to the other end of the bed 2 surface while the cutting disc 10 effectively passes through the access-way 30 of the trolley, engaging the work-piece. When trolley 24 reaches the other end of bed 2, the cut would have been concluded where the work piece can then be removed and trolley 24 retracted to the start position. Trolley 24 design and function no longer require the hand of the operator to hold the work-piece to engage the cutting disc 10 as in many conventional machines. This minimizes the potential for unsafe conditions that can arise in operations of this nature.

In one embodiment, trolley 24 may comprise a water shower system including shower 25 which may span trolley 24 above trolley work surface 26. In accordance with this embodiment, the water shower may provide a very effective medium in the removal of grit produced during cutting operation and to aid as a lubricant to the cutting disc 10 in the cutting of materials other than wood. Shower 25 may comprise a plurality of perforations in linear sequence and in such an arrangement to allow the water to spray onto the entirety of trolley work surface 26. The water shower system may also include water valve 27. In one embodiment, water valve 27 may be disposed below handle 28 of trolley 24. Valve 27 may be used to admit water through shower 25 or to isolate water from shower 25 if water is not required. Water to shower 25 may be supplied through nozzle 69 by hose 52 connected to submersible pump 46 located within recycling and filter unit 4 (see FIG. 6). Pump 46 may pump water through supply water hose 52 which may be held stable by means of water hose support 7 mounted onto a water hose support bracket at one side of bed 2 frame. During operation, the silt contained within the effluent water naturally flows through the access-way 30 on trolley 24 and through opening 17 in bed 2 and thus into bin assembly 67 where it is channelled to recycling and filter unit 4 and can return to shower 25 as filtered water. Non circulated water may be admitted directly to shower 25 via connection of a water supply hose to nozzle 69, bypassing use of the recycle and filter unit 4 as in situations where submersible water pump 46 fails in operation due to electrical power failure or otherwise.

Figure 5A:
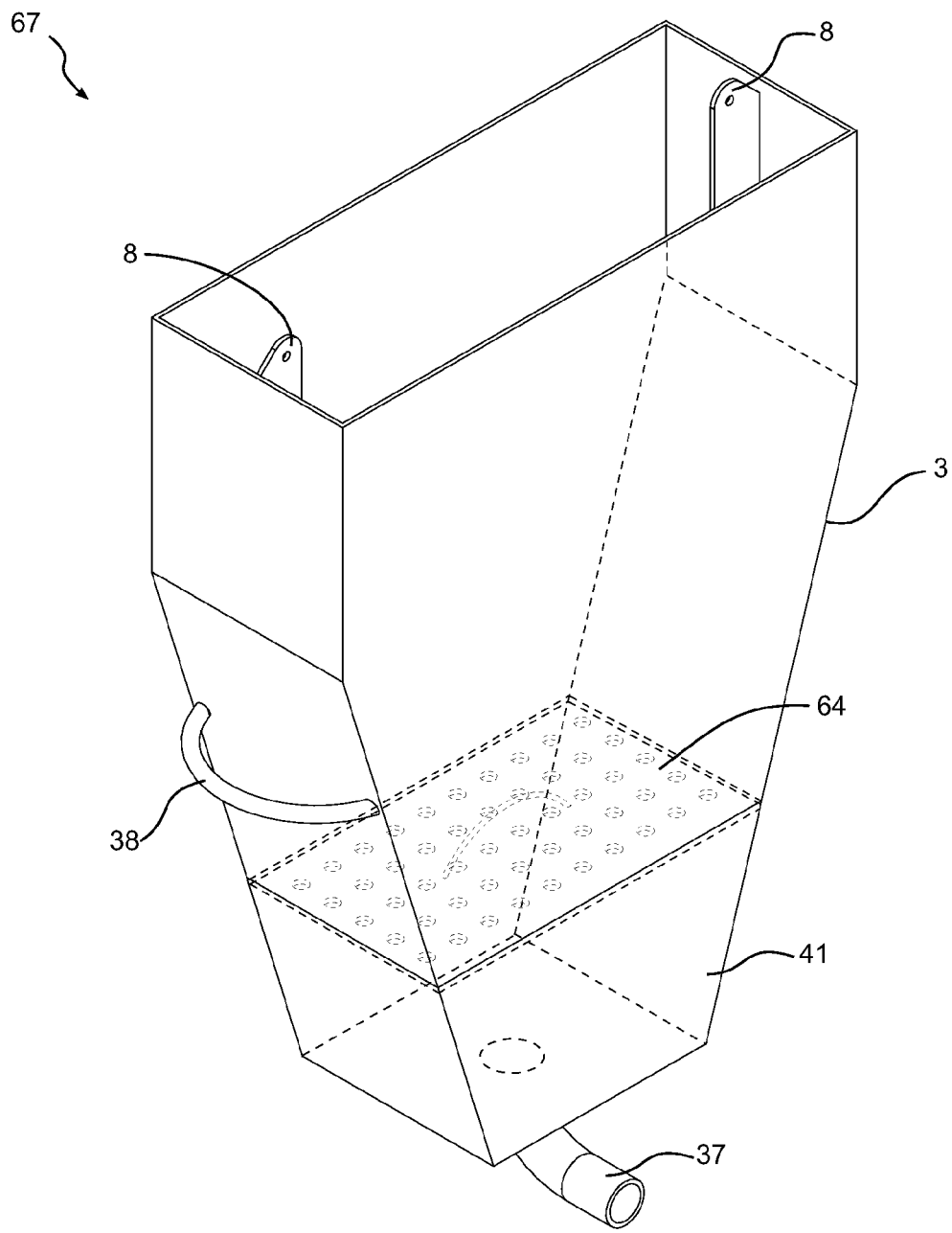
FIGS. 5A and 5B are isometric views of an exemplary bin apparatus and strainer, respectively, in accordance with an embodiment of the present invention.
Figure 5B:
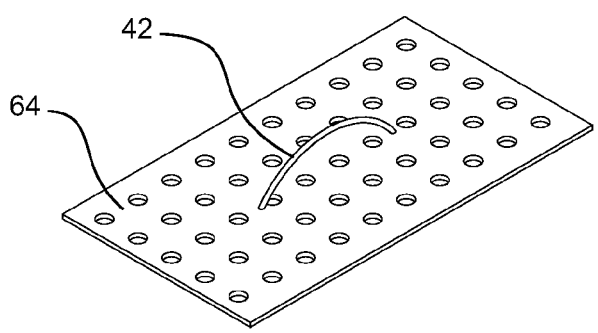

With reference to FIGS. 5A and 5B, bin assembly 67 may be configured as an inverted pyramidal structure with a large open end connected under bed 2 surface in such a way as to follow-through from opening 17 in bed 2; the other end of bin assembly 67 is ported by means of waste water nozzle 37 and connects to recycling and filter unit 4 via water nozzle 37 and waste water hose 51 for transmission of waste water to same unit from bin assembly 67. In the illustrated embodiment, the shape of bin 3 and bin assembly 67 may reduce the structural space required for the machine and can maintain the overall weight within acceptable limits. In the cutting of materials other than wood, a strainer 64, for example a perforated steel sheet with handle 42, may be inserted into bin assembly 67 in a horizontal orientation in order to restrict any entrained particulates within the discharged water. The bottom of bin assembly 67, to which waste water nozzle 37 is attached, may be removed by detaching detachable bottom-section 41. In one embodiment, detachable bottom-section 41 may be detachably attached by means of a tab, bolt and wing nut assembly (not shown) to the main part of the bin 3. As such, in a wood cutting mode of operation, strainer 64 may not be required and all wood shavings produced during operation are contained and directed in bin assembly 67 which are easily removed when bin assembly 67 is filled by removing the bottom-section 41 and allowing the contents to fall into a disposable bag (not shown) or any similar disposal method or device. In addition, bin assembly 67 may be outfitted with one or more handles, e.g., handle 38, for easy lifting and dismounting.

Figure 6:
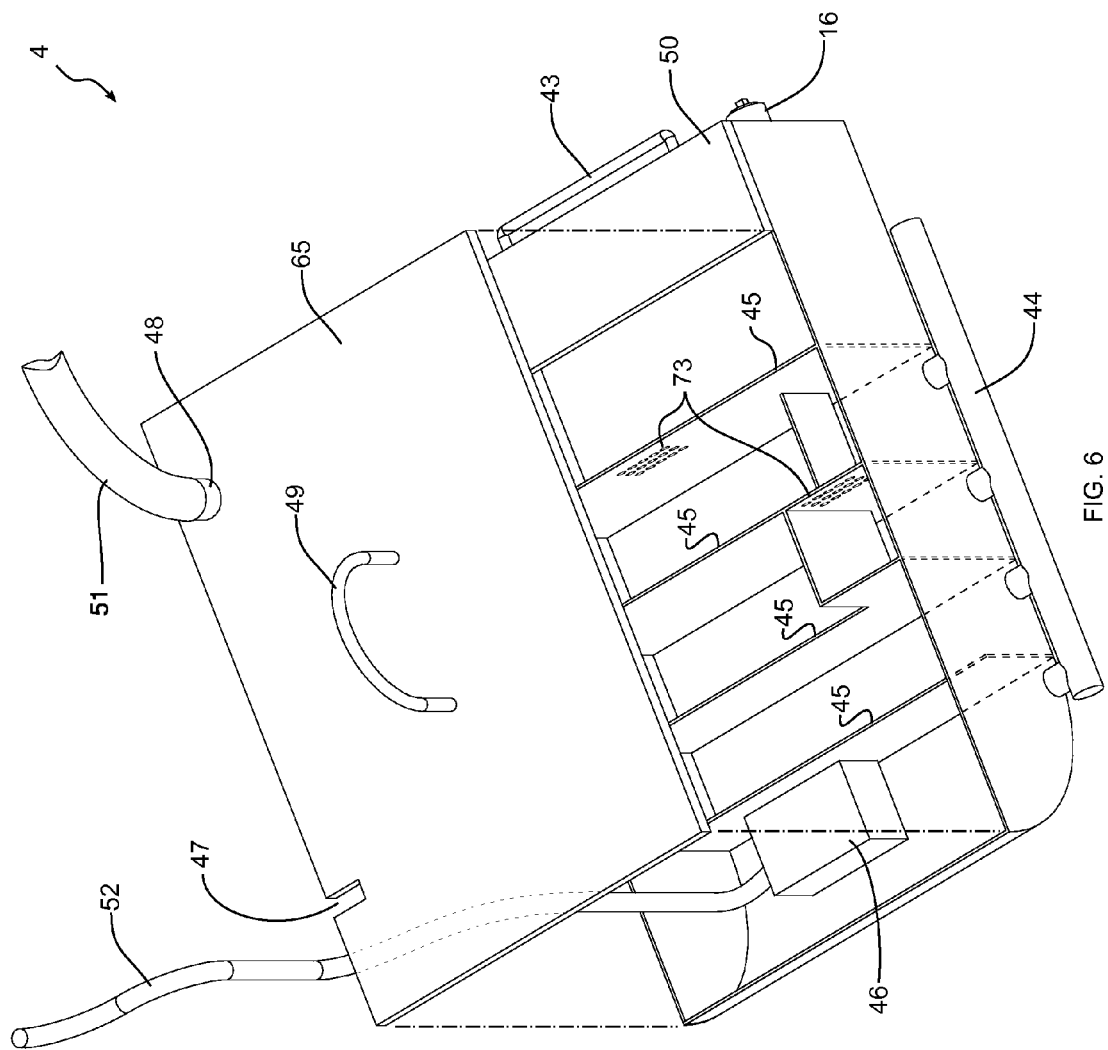
FIG. 6 is an isometric illustration of an exemplary recycling and filter unit (partially exploded) including hoses, pump, power supply and cover.

With reference to FIG. 6, recycling and filter unit 4 is so constructed to be modular in placement in relation to the machine. The said unit may be of rectangular form and reside at the base of the support stand 1 beneath bin assembly 67 where it can be easily removed by simply lifting and removing by the use of handle 43 on one end. Recycling and filter unit 4 may be closed by cover 65 with an appropriately sized inlet 48 that ports waste water hose 51 from bin assembly 67; handle 49 may be fitted at the top to accommodate removal of cover 65 and slot 47 may be extended from one end point of cover 65 to a suitable distance within cover 65 to permit the passage of supply water hose 52 and electrical power cable (not shown) to water pump 46.

In one embodiment, recycling and filter unit 4 comprises a series of chambers in sequential order with the first chamber being the largest and right-most according to FIG. 6. Cover 50 may be sealed onto the top chamber to create a partial enclosure. Baffle plates 45 may be used to divide the recycling and filter unit 4 into the various chambers Effluent water leaving the bin assembly 67 enters the first chamber via waste water hose 51. The water accumulation rate in the first chamber is sufficient that through resident time, the larger of entrained sediments in the effluent water will settle at the bottom. On rising to the top of the chamber, water is filtered through an arrangement of perforations 73 at the top of the baffle plate on one end. This filter process through the baffle restricts entrainments too large to pass through and causes the water to accumulate within a second chamber which, being divided in two, causes water flow to a sub-chamber by means of an opening through the bottom of the baffle plate creating said division. This sub-chamber further filters the water by means of an appropriate voluminous filter such as a sponge (not shown) that utilizes entirely the available space. Water is transmitted to a third chamber by means of an arrangement of perforations 73 on the baffle plate on one end where it enters another sub-chamber and thence to a main chamber by overflowing across a short baffle plate. The water flow from this third chamber to the other two is by similar overflow means into the last chamber where water pump 46 may be disposed to circulate the filtered water.

Filtered waste water manifold 44 may be connected at the outside all chambers of the unit except the first; this manifold 44 allows recycling and filter unit 4 to be easily cleaned out and all chambers drained through said manifold 44 by removing an installed plug (not shown) at the end.

Outlet port 16 may be connected to the inlet chamber at the end of recycle and filter unit 4 to facilitate draining the unit 4 of any retained slush, sediments, water or to flush the unit 4 as required and to provide a means to relieve water from the unit 4 if there is no recycle water circuit due to an exclusion of water pump 46; in such case, it is adequate enough to admit non-circulated water through shower 25, onto the work-piece, through the bin assembly 67, through the first chamber of the recycle and filter unit 4 and thence through the outlet port 16 as with a natural water flow.

Figure 2C:
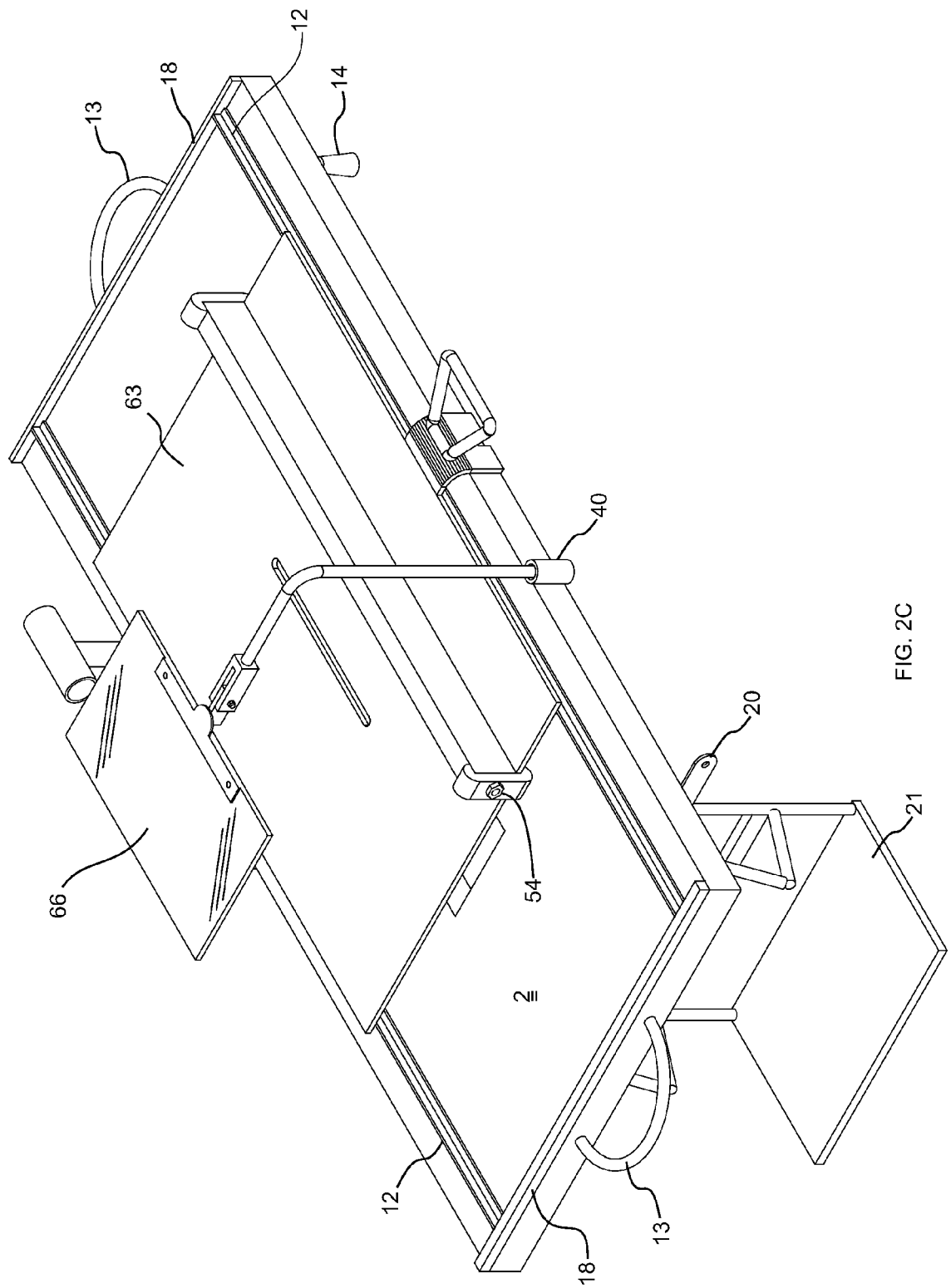
FIG. 2C is yet another view of an exemplary apparatus including a wood cutting table top and shield in accordance with an embodiment of the present invention.
Figure 7:
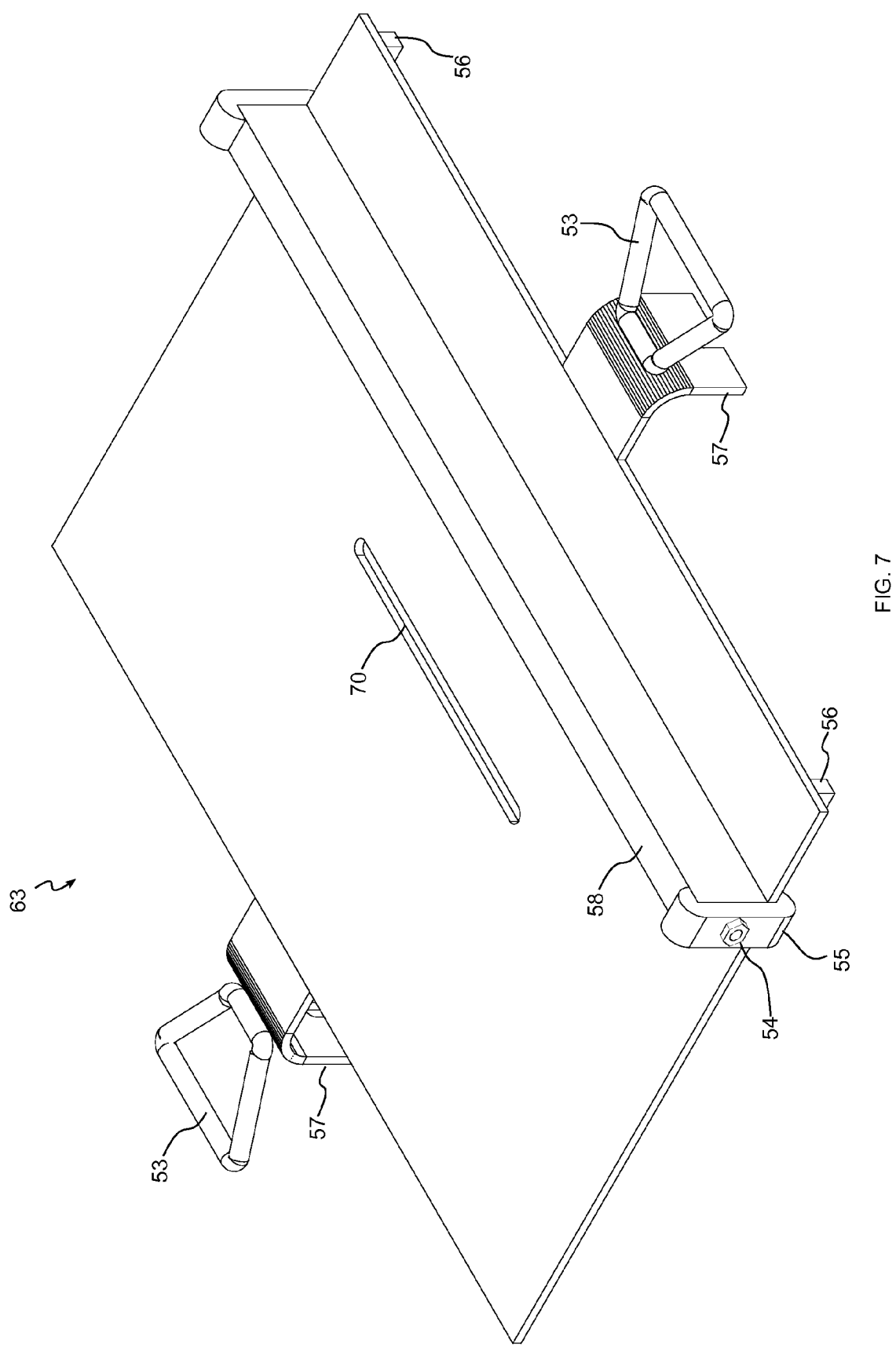
FIG. 7 is an isometric view of an exemplary wood cutting table top in accordance with an embodiment of the present invention.

With reference to FIGS. 2C and 7, in one embodiment, the cutting of wood may be facilitated by the use of a wood cutting table top 63. Wood cutting table top 63 may be a flat rectangular table with handles 53 located, e.g., centrally on both long sides, to provide lifting support for removal and mounting onto bed 2. Wood cutting table top 63 may be held fast onto bed 2 by means of slotted plates 57, configured to engage wood cutting table top lock nuts 9, so as to lock the wood cutting table top 63 in place by tightening of wood table lock nuts 9. The position of the wood cutting table top 63, while mounted and held fast on the bed 2, provides access to wood cutting disc 10 sufficiently projected through blade slot 70 to facilitate the appropriate cutting of wooden objects. Adjustable bar 58, of appropriate height and width and of a length that spans the long side of the wood cutting table top 63 and in parallel relation to the cutting disc 10, may be assembled onto the wood cutting table top 63 by means of supporting members that allow movement of adjustable bar 58 across wood cutting table top 63 up to a point where the finest cut of a wooden object would allow. As such, adjustable bar 58 serves as a guide and support in keeping a wooden object secured in position so as to maintain the cutting mark on the work-piece in-line with the cutting disc 10, i.e., the line of cut. The supporting members within the constructs of the adjustable bar 58 may comprise nuts 54 that drive through adjustable stops 55 and into the end section of the adjustable bar 58. The movement of nut 54 screw-in-wise forces adjustable stop 55 onto support 56 where by this action locks adjustable bar 58 in position; this construct may be on both end sides of adjustable bar 58 and provides an effective means to allow easy mobility and locking of adjustable bar 58. Supports 56 may be configured to fit between track rails 12 such that wood cutting table top 63 is supported on bed 2 by track rails 12 and supports 56.

Figure 8:
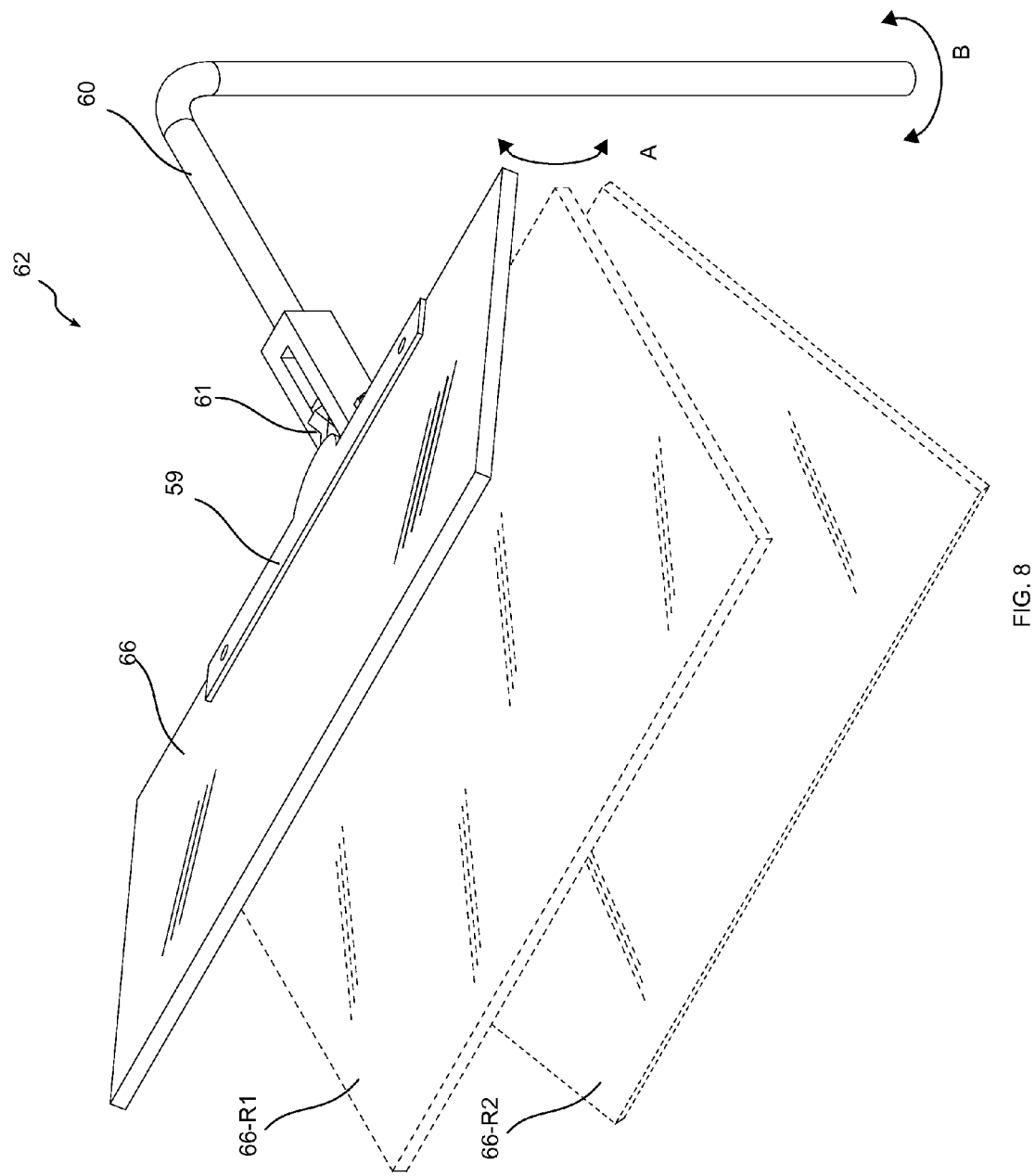
FIG. 8 is an illustration of a wood cutting shield assembly in accordance with an embodiment of the present invention.

With reference to FIG. 8, in association with the wood cutting table top 63 and the wood cutting process, wood cutting shield assembly 62 may be incorporated as an operator safety guard during the wood cutting operation. Wood cutting shield assembly 62 may comprise a transparent plastic sheet 66 (such as the brand PLEXIGLAS®) of a sufficient area disposed in bracket 59 and connected to arm 60. The arm 60 may comprise hinge 61 at one end to optimize placement of sheet 66 about rotation A in accordance with the operator's position. Exemplary alternate positions are illustrated in dashed lines as sheet 66-R1 and 66-R2. This action, with the combined effort of the horizontal, fully circular movement provided by the arm 60 when inserted in shield assembly mount pivot 40 (see FIG. 2C) about rotation B, enables the wood cutting shield assembly 62 to disposed in any position that may be required by the operator. Wood cutting shield assembly 62 allows the operator to clearly visualise the cutting process with the adequate eye and face protection that is needed to ensure the safety of the operator. It provides good impact strength to withstand the impact of deflected projectiles discharged during the wood cutting operation.

Adequate electrical power is supplied to an electric motor 11 to more than sufficiently drive the cutting disc 10 via the belt and pulley arrangement. An emergency stop button (not shown) is incorporated to safely switch off the motor when not in use and an adequate over-current protection device (not shown) is connected to the electric motor main supply to ensure protection of the electric motor and other auxiliaries. Submersible water pump 46, housed within recycling and filter unit 4, is powered from the electrical supply and is operated by means of a pump switch (not shown) independent of electric motor 11. A light may be installed (not shown) to give indication of the pump 46 status of ON or OFF as operated.

What is claimed is:

1. A system for the cutting of construction materials, said system comprising:
   a base configuration including
      a stand,
      a bed removably mounted upon the stand and having an open portion therein,
      a motor drivable blade-mounting shaft disposed beneath the bed and configured so that a circular blade mounted to the shaft is projected through the open portion, and
      a bin disposed beneath the open portion;
   masonry cutting configuration components including
      a track disposed on the bed,
      a trolley configured to travel on the track, the trolley having a work-piece placement surface with a blade channel therethrough, and
      a masonry blade removably mountable to the blade-mounting shaft; and
   non-masonry cutting configuration components including
      a wood cutting table top removably mountable on the bed, and
      a non-masonry blade removably mountable to the blade-mounting shaft;
   wherein the system is configurable for alternate operations including;
      a masonry cutting operation in which the trolley is engaged on the track, the masonry blade is mounted on the blade-mounting shaft, and a masonry work-piece may be disposed on the work-piece placement surface for cutting as the trolley traverses the track; and
      a non-masonry cutting operation in which the wood cutting table top is mounted on the bed, the non-masonry blade is mounted on the blade-mounting shaft, and a non-masonry work-piece may be guided into the blade for cutting.

2. The system of claim 1 further comprising a filter and recycle unit in fluid communication with a drain of said bin, said filter and recycle unit configured to filter particulate matter from effluent detritus from sawing operations.

3. The system of claim 2 wherein:
   the trolley further includes a shower configured to spray effluent on or about a work piece during sawing operations;
   the filter and recycle unit includes a pump disposed to pump filtered effluent to the shower; and
   the pump and the shower are connected in fluid communication.

4. The system of claim 3 wherein the filter and recycle unit comprises a sequence of a plurality of chambers defined by baffles, said baffles and chambers configured to effect settling and filtering of particulate matter from effluent detritus.

5. The system of claim 1 wherein the track comprises a pair of rails and the trolley further includes wheels configured to engage the rails.

6. The system of claim 1, wherein the bin is a removable bin.

7. The system of claim 1, wherein the masonry cutting configuration components further include a shower disposed on the trolley for showering fluid on and about a work-piece.

8. The system of claim 1, wherein the non-masonry cutting configuration components further includes an adjustable guide bar mountable to the wood cutting table top.

9. The system of claim 1, further comprising an articulable transparent safety shield assembly, disposable between an operator of the system and the cutting operation.

10. The system of claim 1, wherein the masonry cutting configuration further includes a work-piece guide fastener.

11. The system of claim 1 wherein the track is a pair of rails.

* * * * *